2,930,447
ADSORPTION PROCESS

Richard M. Barrer, Bromley, England, assignor to Union Carbide Corporation, a corporation of New York No Drawing. Application July 29, 1955
Serial No. 525,380

3 Claims. (Cl. 183—114.2)

This invention relates to a process whereby the adsorptive properties of a molecular sieve are advantageously modified and to a process for effecting the separation of a mixture of molecules using the modified molecular sieve.

Molecular sieves, for example certain zeolites, exhibit adsorptive properties that permit their use in separating mixtures of fluids. Under the proper circumstances the molecular sieve will preferentially or selectively adsorb one constituent of the fluid mixture and reduce its concentration in or completely remove it from the mixture. The preference of a molecular sieve for one material in a mixture is affected by a number of factors including the size and polarity of the molecules in the mixture. Not all molecular sieves exhibit the same preferences nor do they have the same capacities. Thus, the choice of a molecular sieve having the desired properties for a given separation is a matter of prime importance.

It is the object of the prevent invention to provide a process for the modification of the adsorptive properties of a molecular sieve. Another object of the invention is to provide a process for the modification of the properties of a molecular sieve whereby the preference of the sieve for adsorbate molecules is altered.

Naturally occurring molecular sieves contain adsorbed water as do the synthetic molecular sieves which are prepared from aqueous solutions of reactants. Before the molecular sieves can be used as adsorbents a part at least of this adsorbed water must be removed.

It has now been discovered that the adsorptive characteristics of a molecular sieve can be altered by introducing into the dehydrated molecular sieve a quantity of a non-aqueous or dehydrated polar adsorbate. Particularly good results have been obtained using ammonia and ammonia derivatives, for example methylamine, as the modifying polar absorbate. The effect of the presence of such a polar adsorbate in a molecular sieve is determined to an extent by the size of the openings in the molecular sieve crystals. A molecular sieve having small openings, for example chabazite and zeolite A (described below), undergo a change in adsorptive properties which affects their selectivity. Molecular sieves having relatively large "pores," exhibit a change chiefly in their adsorptive capacity as the result of their partial saturation with a polar adsorbate according to the teachings of the invention. The discovery that the properties of molecular sieves can be altered as indicated above permits the use of a given molecular sieve in a wider range of adsorption processes.

The process of the invention is illustrated by the treatment of mordenite, a naturally occurring zeolite. Crystals of mordenite were freed of water and other adsorbed gases by heating them in vacuo at 400° C. for about 48 hours. Measured amounts of methylamine were then adsorbed on the crystals. The capacity of the treated crystals for oxygen and hydrogen at 650 mm. of mercury pressure and −183° C. was determined. The data from these tests are presented in Table I. In the table the amount of adsorbate adsorbed is given in the grams of adsorbate per gram of mordenite.

TABLE I

| Amount of $CH_3NH_2$ | Amount of $O_2$ | Percent Initial $O_2$ Capacity | Amount of $H_2$ | Percent Initial $H_2$ Capacity |
|---|---|---|---|---|
| 0.0 | 0.114 | 100.0 | 0.0059 | 100.0 |
| 0.007 | 0.104 | 91.2 | 0.0051 | 86.5 |
| 0.014 | 0.094 | 82.5 | 0.0045 | 76.3 |
| 0.017 | 0.029 | 25.4 | 0.0041 | 69.5 |
| 0.0207 | 0.007 | 6.1 | 0.0019 | 32.2 |
| 0.0276 | 0.0 | 0.0 | 0.0009 | 15.3 |

From the data in Table I it can be clearly seen that the capacity of the mordenite crystals for oxygen and hydrogen decreases as the amount of methylamine in the crystals increases.

In another series of tests the effect of adsorbed ammonia on the selectivity of chabazite crystals was investigated. The chabazite was activated or dehydrated by heating it for 48 hours at about 450° C. in a vacuum of up to $1 \times 10^{-6}$ mm. of mercury. Ammonia was introduced into the chabazite and the effect of the amount of adsorbed ammonia on the adsorptive properties of the crystals for oxygen, argon, and nitrogen at −183° C. and 650 mm. of mercury was observed. The data obtained during these tests are compiled in Table II. In the table the amounts of adsorbate adsorbed are given as the grams of adsorbate per gram of chabazite.

TABLE II

| Amount $NH_3$ | Amount $O_2$ | Amount A | Amount $N_2$ |
|---|---|---|---|
| 0 | 0.219 | 0.249 | 0.156 |
| 0.015 | 0.198 | 0.214 | 0.138 |
| 0.030 | 0.164 | 0.184 | 0.118 |
| 0.046 | 0.137 | 0.150 | 0.099 |
| 0.061 | 0.106 | 0.064 | 0.051 |
| 0.068 | 0.069 | -------- | 0.014 |
| 0.076 | 0.036 | 0.002 | 0.003 |
| 0.081 | 0.029 | -------- | -------- |

The adsorptive capacity of chabazite for ammonia at −183° C. and 650 mm. of mercury is 0.18 gram of ammonia per gram of chabazite. From this and the data it can be seen, for example, that when the adsorptive capacity of the crystals for oxygen is reduced to 0.036 while the ammonia adsorbed is 0.076, there is a substantial amount of pore volume remaining in the crystals.

In addition to the naturally occurring molecular sieves, mordenite and chabazite, synthetic molecular sieves, designated zeolite X and zeolite A, have had their adsorptive properties modified and have been used to effect separations of mixtures of molecules according to the invention.

Zeolite X may be made according to the procedures described in United States patent application Serial No. 400,389, filed December 24, 1953, now U.S. Patent No. 2,882,244, issued April 14, 1959. The composition of zeolite may be represented as

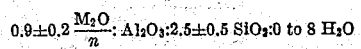

A typical composition for the sodium form of zeolite X may be represented as

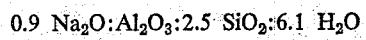

The major X-ray diffraction lines of a sample of crystalline zeolite X, including the sodium form thereof, are given in Table A:

TABLE A

*d value of reflection in A.*

14.42±0.2
8.82±0.1
4.41±0.05
3.80±0.05
3.33±0.05
2.88±0.05
2.79±0.05
2.66±0.05

In obtaining the X-ray diffraction powder patterns, standard techniques were employed. The radiation was the Kα doublet of copper, and a Geiger counter spectrometer with a strip chart pen recorder was used. The peak heights, I, and the positions as a function of 2 θ, where θ is the Bragg angle, were read from the spectrometer chart. From these, $d(obs)$, the interplanar spacing in A. corresponding to the recorded lines was calculated. The X-ray patterns indicate a cubic unit cell of dimensions between 24.5 A. and 25.5 A.

Zeolite A may be made according to the procedures described in United States patent application Serial No. 400,388, filed December 24, 1953, now U. S. Patent No. 2,882,243 issued April 14, 1959. The composition of zeolite A may be represented as

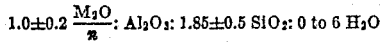

In this formula "M" represents a cation and "n" its valence. A typical composition for the sodium form of zeolite A may be represented as

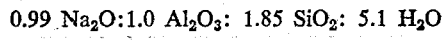

The major lines of the X-ray diffraction pattern of zeolite A are shown in Table B. These lines were obtained using the same techniques employed with respect to the data shown in Table A.

TABLE B

*d value of reflection in A.*

12.2 ±0.2
8.6 ±0.2
7.05±0.15
4.07±0.08
3.68±0.07
3.38±0.06
3.26±0.05
2.96±0.05
2.73±0.05
2.60±0.05

The effect on the adsorptive properties of zeolite A is illustrated by the data in Table III. The data were obtained by measuring the amount of oxygen adsorbed by sodium zeolite A crystals which had been modified by the adsorption of small amounts of ammonia. The amount of ammonia is given in grams of adsorbate per gram of sodium zeolite A and the amount of oxygen is listed in terms of the percentage by weight of oxygen adsorbed by the crystals. The measurements were made at −183° C. and 700 mm. of mercury.

TABLE III

| Amount of NH₃ | Amount of Oxygen |
|---|---|
| 0 | 23.0 |
| 0.01 | 11.0 |
| 0.02 | 4.2 |
| 0.03 | 0.7 |
| 0.04 | 0.0 |

From the data in Table III it can be seen that small amounts of ammonia greatly reduce the capacity of the crystals of sodium zeolite A for oxygen. This permits the use of sodium A zeolite in separations wherein the rejection of oxygen by the adsorbent is desired.

The effect of a non-aqueous non-polar adsorbate on a molecular sieve having a relatively open structure is demonstrated by the data in Table IV. In the table the capacity of sodium zeolite X for neopentane or tri-n-butylamine in the presence of various amounts of benzene appears. The amounts of adsorbed material are given as grams or milliliters of adsorbate per gram of adsorbent (designated g./g. and ml./g. respectively). The data involving the neopentane was obtained at 25° C. and 700 mm. of mercury pressure while the data involving tri-n butylamine was obtained at 25° C. and 1 mm. of mercury pressure.

TABLE IV

| Benzene | | Neopentane | | Benzene and Neopentane, ml./g. | Tri-n-butylamine | | Benzene and Tri-n-butylamine, ml./g. |
|---|---|---|---|---|---|---|---|
| g./g. | ml./g. | g./g. | ml./g. | | g./g. | ml./g. | |
| 0 | 0 | 0.142 | 0.241 | 0.241 | 0.215 | 0.276 | 0.276 |
| .05 | 0.057 | 0.108 | 0.183 | 0.240 | 0.166 | 0.214 | 0.271 |
| .10 | 0.114 | 0.077 | 0.131 | 0.245 | 0.120 | 0.154 | 0.268 |
| .15 | 0.171 | 0.044 | 0.075 | 0.246 | 0.070 | 0.090 | 0.261 |
| .20 | 0.228 | 0.012 | 0.020 | 0.248 | 0.016 | 0.026 | 0.254 |

It can be seen from the data in Table IV that with sodium zeolite X the presence of one dehydrated non-polar adsorbate in the crystal does not alter the selectivity of the crystal but merely subtracts from the available pore space in the crystal.

Molecular sieves modified according to the teachings of the invention may be used to separate mixtures of molecules. For example the data in Table II relating to chabazite shows that as the amount of ammonia in the crystal is increased the capacity of the crystal for nitrogen is decreased to a greater extent than is the capacity of the crystal for oxygen. Thus the modified crystal can be used advantageously to effect a separation of oxygen and nitrogen by preferentially adsorbing oxygen.

What is claimed is:

1. A process for the resolution of a mixture of oxygen and nitrogen by preferential adsorption of oxygen on dehydrated chabazite which comprises providing a quantity of dehydrated chabazite, adsorbing on said chabazite ammonia in an amount less than the capacity of said chabazite for ammonia to increase the relative capacity of said chabazite for oxygen, and thereafter contacting said mixture with said modified chabazite and selectively adsorbing on said chabazite the oxygen in said mixture.

2. A process for the resolution of a mixture of oxygen and argon by preferential adsorption of oxygen on dehydrated chabazite which comprises: providing a quantity of dehydrated chabazite, adsorbing on said chabazite ammonia in an amount greater than 0.061 gram of ammonia per gram of chabazite and less than the capacity of said chabazite for ammonia to increase the relative capacity of said chabazite for oxygen, and thereafter contacting said mixture with said modified chabazite and selectively adsorbing on said chabazite the oxygen in said mixture.

3. A process for the resolution of a mixture of oxygen and hydrogen by preferential adsorption of hydrogen on dehydrated mordenite which comprises providing a quantity of dehydrated mordenite, adsorbing on said mordenite methylamine in an amount greater than about 0.0276 gram of methylamine per gram of mordenite and less than the capacity of said mordenite for methylamine to increase the relative capacity of mordenite for hydrogen; and thereafter contacting said mixture with said modified mordenite and selectively adsorbing on said mordenite the hydrogen in said mixture.

References Cited in the file of this patent

UNITED STATES PATENTS

| | | |
|---|---|---|
| 1,443,220 | Guye et al. | Jan. 23, 1923 |
| 2,254,799 | Erdmann | Sept. 2, 1941 |

OTHER REFERENCES

"Separation of Mixtures Using Zeolites as Molecular Sieves," by R. M. Barrer, J. Soc. Chem. Ind., vol. 64, May 1945, pages 130 to 135.

"Sorption by Gmelinite and Mordenite," by R. M. Barrer, Trans Faraday Soc., volume 40 (1944), pages 555–564.